United States Patent [19]

Dobbs

[11] Patent Number: 4,715,642
[45] Date of Patent: Dec. 29, 1987

[54] MAP DISPLAY

[76] Inventor: Paul T. Dobbs, 16083 Southampton, Livonia, Mich. 48154

[21] Appl. No.: 914,676

[22] Filed: Oct. 2, 1986

[51] Int. Cl.⁴ .................................................. B60R 27/00
[52] U.S. Cl. ...................................... 296/1 R; 296/70; 40/593
[58] Field of Search ............ 296/1 R, 70, 97 R, 97 C, 296/97 D, 97 G; 40/591, 593

[56] References Cited

U.S. PATENT DOCUMENTS

| | | | |
|---|---|---|---|
| 3,254,435 | 6/1966 | Rix | 296/97 D |
| 3,868,293 | 2/1975 | Selph | 296/97 R |
| 4,132,022 | 1/1979 | Wood, Jr. | 40/591 |
| 4,470,214 | 9/1984 | Kinloch | 40/593 |

*Primary Examiner*—Robert R. Song
*Attorney, Agent, or Firm*—Charles W. Chandler

[57] ABSTRACT

A map is mounted on the dashboard of a vehicle such that the image of the map can be viewed on the windshield by a user within the vehicle without removing his eyes from the windshield.

1 Claim, 3 Drawing Figures

MAP DISPLAY

BACKGROUND OF THE INVENTION

This invention is related to means for permitting a vehicle driver to view the image of a map without removing his eyes from the windshield, and more particularly to means for supporting the reverse image of a map on the dashboard of a vehicle such that the image of the map is reflected on the windshield.

Many motor vehicle drivers must refer to a map while driving a vehicle to locate a geographical address. This driver has to remove his eyes from the windshield and risk failing to observe oncoming traffic conditions. There are many devices in the prior art to assist the user in having a map readily available, some of which tend to follow the vehicle as it progresses down a highway. However, such devices also require the driver to move his eyes from the windshield thus creating a dangerous situation as the vehicle is moving along the road.

SUMMARY OF THE INVENTION

The broad purpose of the present invention is to provide means for supporting a map in a vehicle such that the image of the map is reflected on the windshield. The user can view the information on the map without removing his eyes from the windshield. In the preferred embodiment of the invention, a map with a reverse image is mounted on the dashboard of the vehicle. The image of the map is reflected on the windshield so that the user can study the information on the map. Preferrably a thin film is also attached on the inside of the windshield to eliminate a double image of the map.

An internal illumination is also mounted in the vehicle for enhancing the image of the map during those hours when natural light has faded.

The map can take various forms such as being mounted on a reel that is wound as the vehicle progresses down an interstate highway.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
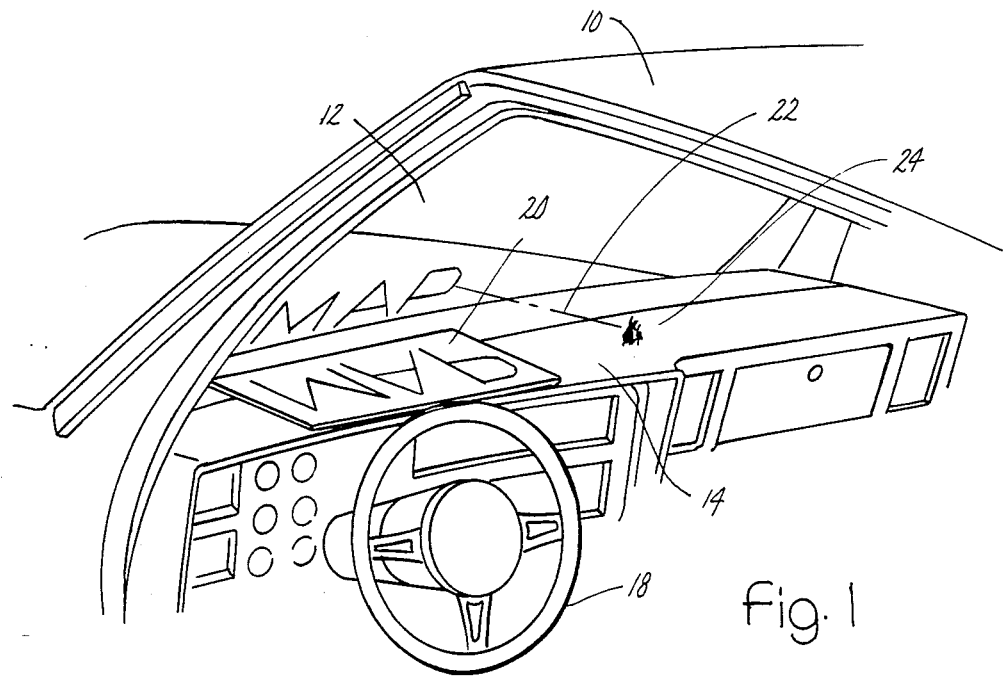
FIG. 1 is a view showing the preferred map display mounted on the dashboard of a vehicle adjacent a windshield.

Referring to the drawing, FIG. 1 illustrates a motor vehicle 10 having a conventional windshield 12. Dashboard 14 is mounted in the vehicle beneath the windshield and has top mounting surface 16. Conventional steering wheel 18 is mounted within the vehicle adjacent the dashboard.

Figure 2:
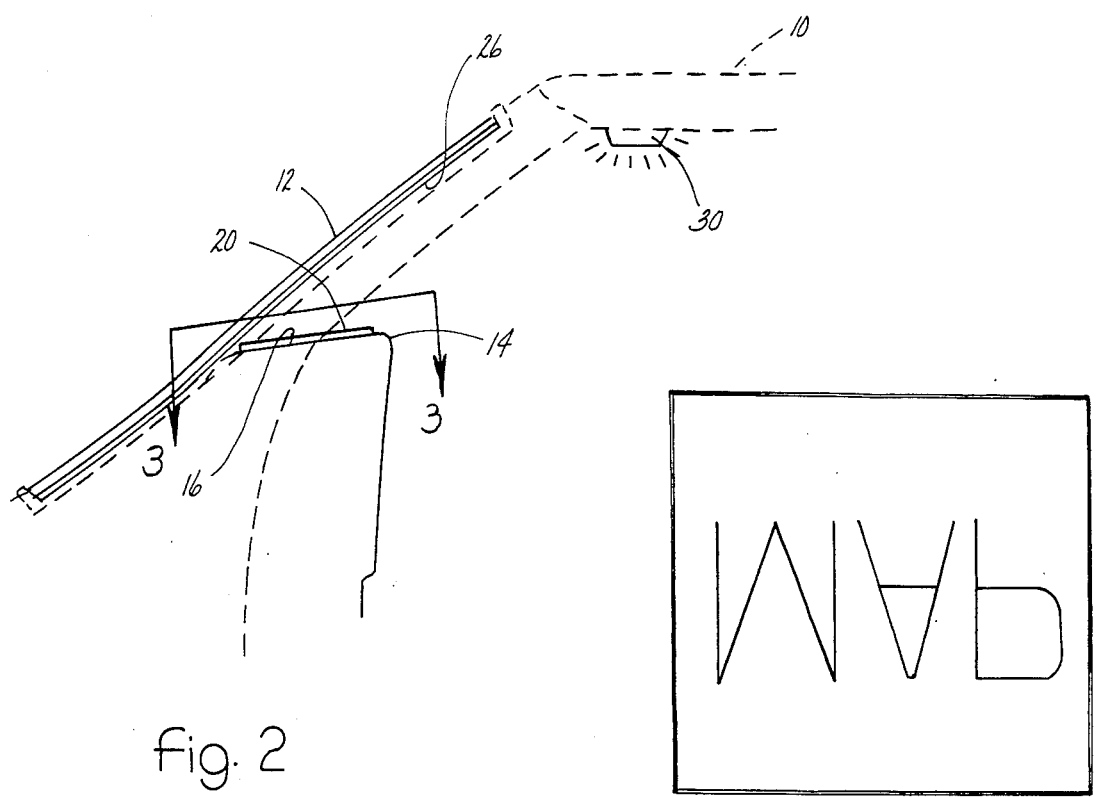
FIG. 2 is a view similar to FIG. 1 but showing the internal illumination means.
Figure 3:
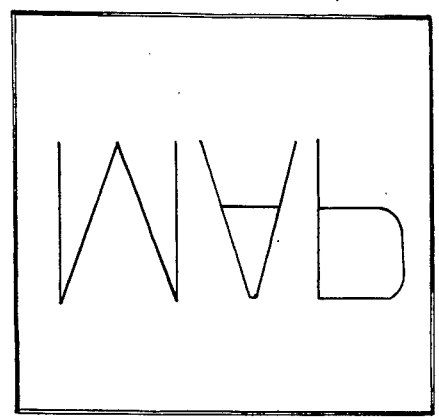
FIG. 3 is a view as seen along lines 3—3 of FIG. 2.

Referring to FIGS. 2–3, map 20 having the reverse image of a geographical area is mounted on the dashboard. Map 20 is shown on a sheet of paper, however, it can be mounted on other means for displaying the geographical representation or other useful information to the user. Further, map 20 can be one of a series of maps each providing geographic information about different areas. For example, a series of maps can be provided which progressively illustrate to the driver pertinent geographical information as he advances down an interstate highway.

Map 20 is mounted on the dashboard such that the user's line of sight 22 views the reflected image of the map on windshield 12. The map can be moved to display the image in different position on the windshield to accommodate the location of the user's eyes 24.

A gray translucent film 26 is attached to the interior surface of the windshield to prevent the formation of a double image of the map.

A variety of useful information can be displayed from a reverse image on the map.

The concept of a reflected image of information can be employed in other environments. For example it can be used as an advertising display in which a translucent store window permits a user on one side of a window to view an object on the opposite side while simultaneously viewing information reflected on the window from a third position so that he can view two sources of information without removing his eyes from the window.

An internally mounted light 30 is mounted in the vehicle for illuminating map 20 when the light conditions outside of the vehicle have faded to a level where it provides an insufficient illumination of the map.

Having described my invention, I claim:

1. In a vehicle having a driver's compartment, a dashboard having a top surface, and a windshield mounted above the dashboard for a driver in the driver's compartment to view oncoming traffic conditions along a line of sight, the combination comprising:

a sheet element having a reverse image of a map thereon, the sheet element being removeably mounted on the top surface of the dashboard in such a position that a mirror image thereof is reflected on the windshield in the path of said line of sight so as to be viewable along said line of sight of the driver whereby he need not change his line of sight for viewing oncoming traffic conditions to view said mirror image but only refocus his eyes to read the mirror image of the map on the windshield, and a film mounted on the inside surface of that portion of the windshield on which the mirror image of the map is being reflected so as to eliminate any double image thereof at such time as the line of sight is focused on said mirror image.

* * * * *